United States Patent [19]

Gibes

[11] Patent Number: 4,695,728

[45] Date of Patent: Sep. 22, 1987

[54] PORTABLE RADIATION CONTAMINATION DETECTOR

[76] Inventor: Terrence R. Gibes, 1214 Illini Dr., Lockport, Ill. 60441

[21] Appl. No.: 833,011

[22] Filed: Feb. 26, 1986

[51] Int. Cl.$^4$ .......................... G01J 1/00; G01F 23/00
[52] U.S. Cl. ............................. 250/336.1; 250/358.1; 250/505.1
[58] Field of Search ...................... 250/505.1, 328, 337, 250/515.1, 374, 497.1, 506.1, 252.1, 336.1, 358.1, 388

[56] References Cited

U.S. PATENT DOCUMENTS

| | | | |
|---|---|---|---|
| 3,026,414 | 3/1962 | Commins | 250/497.1 |
| 3,419,720 | 12/1968 | Debye | 250/337 |
| 3,643,096 | 2/1972 | Jeffries | 250/497.1 |
| 3,655,983 | 4/1972 | Forrer | 250/497.1 |

*Primary Examiner*—Janice A. Howell
*Attorney, Agent, or Firm*—Balogh, Osann, Kramer, Dvorak, Genova & Traub

[57] ABSTRACT

A radiation detector apparatus having a shielded container made from radiation-resisting material, the container having a cover clamped on a heavy base, the cover having a protruding section which is received in a corresponding receding section in the base. The opposed faces of the receding and protruding sections are spaced apart to define a curvilinear passage therebetween, the passage having disposed therein, a slide retainer having a curvilinear configuration and provided with a pair of opposed tracks for receiving a test sample. The test sample comprises a test slide provided with a swab for picking up contaminated dust. The test slide is inserted between folds of a retainer, an upper fold having a radiation transparent window for registering with the swab. The retainer is transported on a test slide carrier into the interior of the shielded container via the slide retainer. The top is provided with an interior chamber for housing a detector which is connected by a cable passing through a convoluted conduit passage to a connector on the exterior surface of the cover for a further connection by a cable to a radiation-reading instrument. The interengaging wall portions of the top and the base provide a minimum of 2-inch radiation protection to the chamber containing the detector.

8 Claims, 6 Drawing Figures

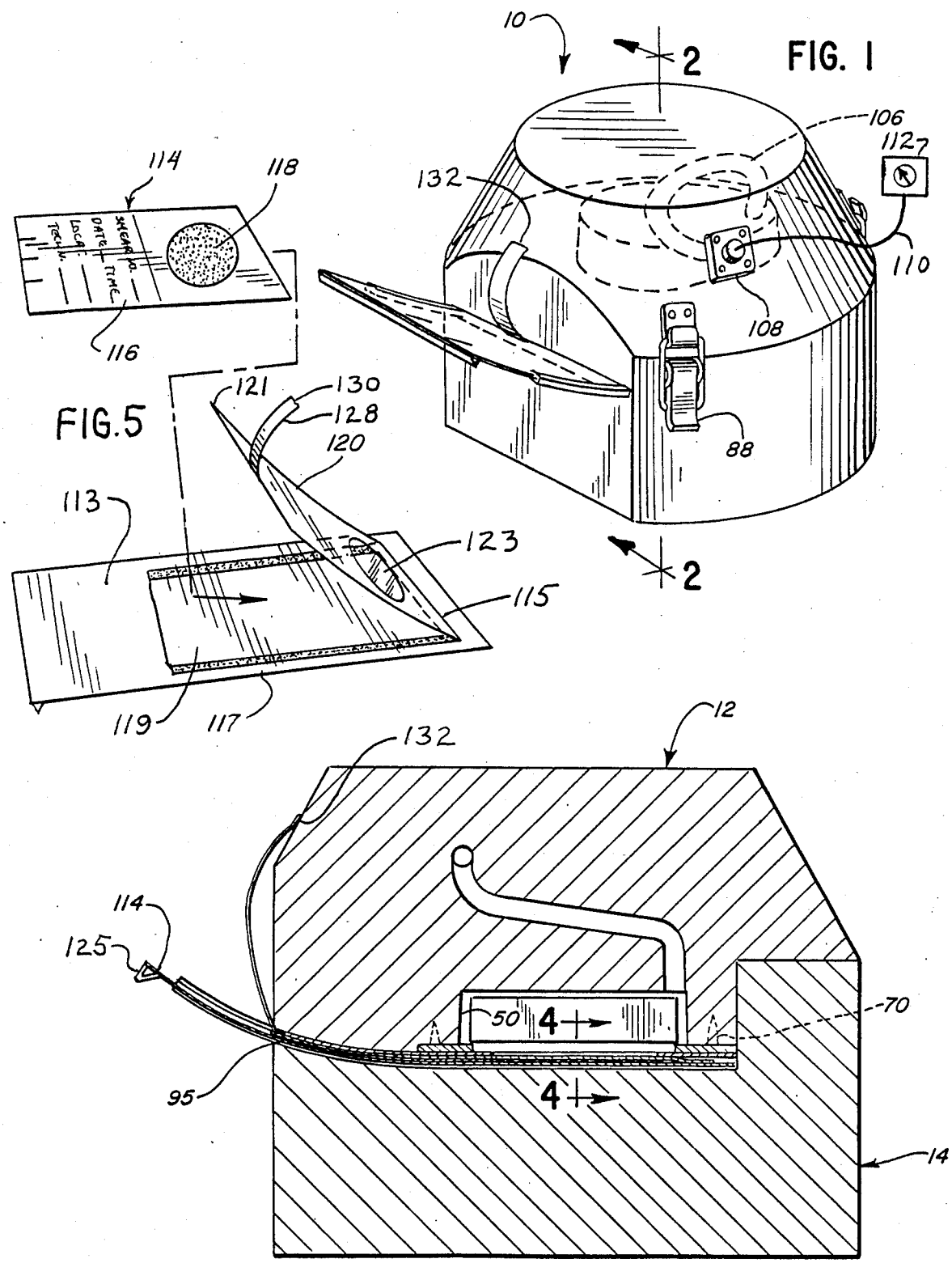

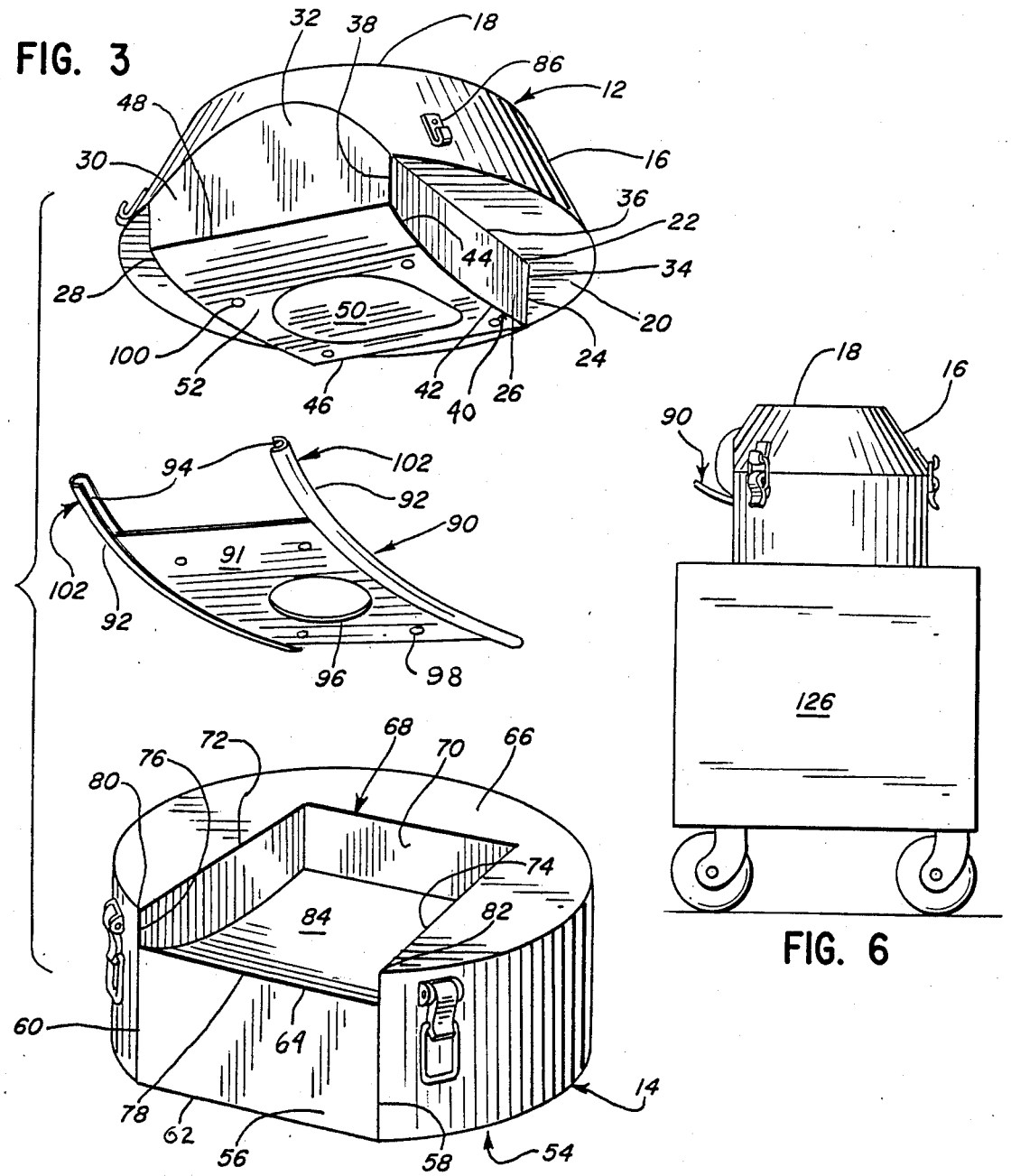
FIG. 3
FIG. 6
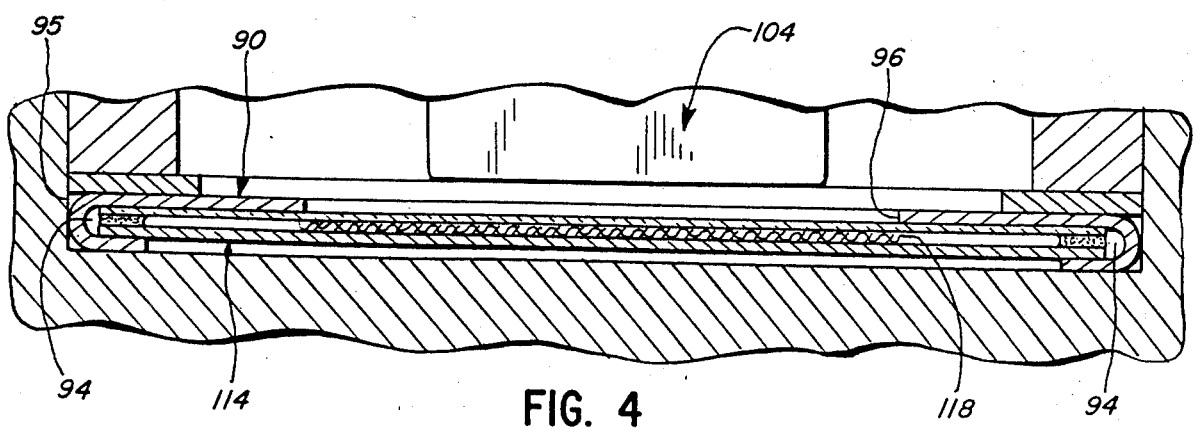
FIG. 4

PORTABLE RADIATION CONTAMINATION DETECTOR

FIELD OF THE INVENTION

This invention is generally concerned with detectors for sensing radiation given off by radioactive sources, and more particularly with a detector within a shielded container which has an opening for accepting test slides bearing radioactively contamined material.

DESCRIPTION OF THE PRIOR ART

Shielded containers for storing radioactive sources have been described in U.S. Pat. Nos. 3,026,414-3,655,983 and 3,643,096.

The various shielded containers also include detectors within the containers, the detectors being connected to radiation indicators to permit personnel to obtain a most secure storage position within the container, thereby avoiding unnecessary radiation exposure to the personnel. However, none of the foregoing combinations of shielded containers with radiation detectors show any arrangement for providing radiation readings from contaminated test slides introduced into the interior of the shielded combination into the shielded containers.

Currently, in nuclear power plants, radiation protection personnel perform surveys of plant areas to detect contamination produced by alpha, beta and gamma emitters, and also to determine dose rates from beta, gamma and neutron radiation buildup in plant equipment. These surveys are performed on almost continuous basis to monitor area dose rates and to prevent contamination from spreading from monitored control areas to non-controlled areas in the plant.

A time-consuming portion of this testing process involves taking numerous standard sample smears of floors, walls, and equipment, and then taking the sample smears out of the surveyed area to another location to take a radiation reading of the sample smears. The reason that the sample smears are not tested in the survey area is because of ambient beta and gamma radiation present in the survey area. Even a slight dose rate from beta and gamma emitters would interfere with the readings obtained from the sample smears.

The only apparatus currently used for testing the sample smears in ambient beta and gamma fields comprises a shielded container built of lead bricks and enclosing a radiation detector. The shielded container has a small slot which allows insertion of sample smears to be placed adjacent the radiation detector. The intensity of the radiation registered by the radiation detector is indicated by a meter located on the exterior of the shielded container.

The foregoing arrangement is not too practical because of the weight of the apparatus, which cannot be readily removed from one location to another.

SUMMARY OF THE INVENTION

A portable radiation contamination detector comprises a shielded container comprised of two or more shield components formed of radiation resistant material. The assembly of the two components defines an interior chamber for housing a radiation detector, the chamber having a curvilinear passage adapted to admit the insertion of a sample smear contained on a test slide. The two components of the shielded container are provided with complementary protruding and receding sections which, in turn, are provided with rectilinear and curvilinear wall surfaces which interlock with each other to provide a wall thickness of at least 2 inches of radioactive resistant material to protect the radiation detector from stray radiation. The interlocking of the protruding and receding sections in such as to prevent any straight line radiation penetration through the material to affect the reading of the detector. The assembly of the two components of the shielded container defines a slot adapted to accommodate a slide retainer provided with guide tracks for receiving a test slide. The test slide comprises a card made from paper or other suitable material and containing a smear swab made of dust attracting material, such as cotton, and adapted to pick up dust or dirt. To prevent the shielded container from being contaminated by numerous insertions of the test slides, each test slide is placed in a folded paper retainer provided with a protective window made of suitable material, such as cellophane, which overlies the smear swab and is secured by pressure sensitive adhesive to a test slide carrier. The test slide is provided with data blanks which have to be filled out by the test personnel to identify the location, date, and radiation reading. The slide retainer is defined by rectilinear and curvilinear portions corresponding to the rectilinear and curvilinear portions defined by the walls of the two portions of the shield components to deny straight line radiation entry into the interior of the container. The shielded container is adapted to be mounted on a carriage which can be readily transported from one location to another location within the same survey area or to other survey areas.

The main object of the invention is to provide a portable radiation contamination detector for taking readings along the various locations in a survey area.

Another object of the invention is to provide an apparatus which permits taking immediate readings of test slides as soon as they are taken.

A further object of the invention is to provide a shielded container having an interiorly located chamber for housing a radiation detector completely shielded from exterior radiation.

Also, it is the object of the invention to provide a shielded container made of at least two components which have interengaging wall structures to provide a radiation shield of lead of at least 2-inch thickness.

BRIEF DESCRIPTION OF THE DRAWINGS

FIG. 1 is a pictorial view of a radiation contamination detector;

FIG. 2 is a sectional view of the detector taken along the line 2—2 in FIG. 1;

FIG. 3 is an exploded view showing most of the components comprising the detector;

FIG. 4 is an enlarged partial cross-section of the detector taken along line 4—4 of FIG. 2;

FIG. 5 is a pictorial view of a test slide carrier for introducing a test slide into the interior of the detector; and FIG. 6 shows the detector mounted on a carriage.

DESCRIPTION OF THE PREFERRED EMBODIMENT

A shielded container 10 is assembled from two shielded components 12 and 14, the shield component 12 being in the form of a cover, and the shield component 14 being in the form of a base. The cover 12 has a truncated conical portion 16 having a top 18 and a bottom 20 from which protrudes a section 22. The section 22 has a rectilinear back wall 24, a pair of opposed walls 26 and 28, and a front wall 30 which is planar and melds with a truncated wall portion 32 of the cover 12. Each of the opposed walls 26 and 28 is defined by rectilinear edges 34, 36, and 38, and a compound edge 40 having a rectilinear portion 42 terminating in a curvilinear portion 44. The rectilinear back wall 24 has a rectilinear edge 46 which orthogonally meets rectilinear edges 34 and the rectilinear portions 42 of the compound edges 40. The front wall 30 has an edge 48 defined by the rectilinear edges 38 and meets with the curvilinear portions 44 of the compound edges 40. The section 22 has a chamber 50 which functions to house a detector, as will be described later. The compound edges 40, in conjunction with the rectilinear edges 46 and 48, define a compound planar surface 52 having planar and curvilinear portions as defined by the rectilinear portions 42 and curvilinear portions 44 of the compound edges 40.

The base 14 comprises a cylindrical portion 54 having a diameter corresponding to the diameter of the bottom 20 of the cover 12. A portion of the cylindrical portion 54 is truncated to define a front wall 56 defined by a pair of opposed rectilinear edges 58 and 60, a lower edge 62 and an upper edge 64. An upper surface 66 of the base 14 has a receding section 68 bounded by a rectilinear wall 70, a pair of opposed compound walls 72 and 74, and an opening 76 as defined between the upper portions of the rectilinear edges 58 and 60, an edge 78 of the front wall 56, and a line (not shown) which extend between corners 80 and 82. The compound walls 72 and 74, toegether with the rectilinear wall 70 and the edge 78, define a compound coplanar surface 84 which has rectilinear and curvilinear portions defining the configuration corresponding to the compound planar surface 52 of the cover 12.

The cover 12 is provided with several retainers 86 which cooperate with a similar number of clamps 88 secured to the base 14 for maintaining the assembly of the cover and base together.

A slide retainer 90 is adapted to be positioned between the cover 12 and the base 14 in the receding section 68 of the base 14. The slide retainer 90 is made from a sheet of metal 91 having flanged edges 92 which define a pair of opposed tracks 94. As shown in FIG. 3, the metal sheet 91 is provided with an opening 96 and a series of apertures 98 which will admit fasteners for securing the slide retainer 90 to threaded openings 100 in the protruding section 22 of the cover 12. The metal sheet 91 has been undercut so that the flanged edges 92 define a pair of slide receiving horns 102.

As shown in FIG. 2, the chamber 50 in the cover 12 houses a detector 104 which is secured in the chamber by the sheet metal 91, the opening 96 in the sheet metal 91 being smaller than the dimension of the detector 104. The chamber 50 communicates to the exterior of the cover 12 by means of a tortuous conduit passage 106. A cable (not shown) passes through the conduit passage 106 and connects the detector 104 to a connector 108 secured to the cover 12 at the outlet of the conduit passage 106. A cable 110 connects the coupling 108 to an instrument 112 for providing a reading of the radiation magnitude determined by the detector 104.

As shown in FIG. 5, a test slide 114 comprises a sheet 116 made from a material such as paper containing a swab 118 from a material, such as cotton, which readily picks up dust particles. The test slide 114, after a test swab has been wiped on a test surface, is placed in a retainer 115 which comprises an elongated sheet of paper 113, folded over, to possess a bottom portion 119 and an upper portion 121 which has a window 123 made from a clear radiation transparent material, such as cellophane. The bottom portion 119 of the retainer 115 has a coating of pressure sensitive adhesive so that the retainer 115 can be mounted on top of a test slide carrier 117 which is made from a suitable stiff sheet having an underturned edge 125 to facilitate the grasping of the test slide carrier 117. The sheet 116 has printed matter thereon with blank spaces for filing in information as to the location, time, name of the testing personnel, radiation reading, etc. As is evident, the placement of the test slide 114 in the retainer 115 will align the position of the swab 118 under the window 123. The free end of the upper portion 121 of the retainer 115 is provided with a ribbon 128 having an end 130 which is attachable to a spot 132 on the cover 12.

As can be seen in reference to FIGS. 1, 2, and 5, after a smear test has been taken by means of the swab 118, the test slide 114 is inserted between the lower and upper portions of the retainer 115, and then the slide carrier 117 is inserted into the slide retainer 90 disposed in the curvilinear passage 95 defined between the cover 12 and the base 14. Thereafter, the free end 130 of the ribbon 128 is adhesively attached to the cover 12. If the reading on the instrument 112 shows that no radiation contamination has been lodged on the swab 118, the test slide 117 is pulled out partially out of the shielded container 10, thereby causing the ribbon 128 to uncover the bottom portion of the slide retainer 115 so that the tested slide 114 can be readily removed and another test slide 114 can be readily inserted to test another swab.

In the event that the retainer 115 should become contaminated by a swab which has picked up radiation contamination, the contaminated retainer 115 can be peeled off the test slide carrier 117 and a new retainer 115 installed on the test slide carrier.

The cover 12 and the base 14 are filled with a radiation resistant material such as lead. In view of the large mass of lead used to construct the shielded container 10, a carriage 126 is used to transport the shielded container from one area to another.

The shielded container 10 is constructed so that all walls are at least 2 inches thick to substantially eliminate stray radiation so as not to effect the reading of the detector 104. The detector can be a Geiger-Muller detecting tube, Type No. 8767, made by L. N. D., Inc., 32-30 Lawson Boulevard, Oceanside, N.Y. 11572. This detector will given an indication of the presence of particles contaminated by Beta-ray contamination or Gamma-ray contamination picked up by the swab 118 on the test slide 114.

Referring to the shielded container 10 in FIG. 3, it will be seen that, after the slide retainer 90 is secured to the bottom of the protruding section 22 of the cover 12, and then the cover 12 is positioned over the base 14, a spacing existing between the compound planar surface 52 of the protruding section 22 and the compound planar surface 84 of the receding section 68 in the base 14 will define a curvilinear passage 95, as best shown in FIG. 2. The configuration of this passage is such as to deny a straight-line penetration of any ambient Beta or Gamma radiation. Therefore, the reading obtained by the detector and reflected in the test instrument 112 will give a true indication of the contamination picked up by the swab 118.

As has been described so far, the shielded container 10 has shield components 12 and 14 having particular sections interlocking with each other and provided with particular wall surfaces so as to obtain no straight-line entry into the interior of the shielded container to affect a detector located therein. It should be pointed out that other types of configurations of structures which interlock with each other can be obtained, and, therefore, it is not the intention that the detailed description of the apparatus described herein should be limited to the exact configuration of the surface and component interactions. Therefore, it is the intention that the features of the invention be broadly construed as set out in the following claims.

What is claimed is:

1. A radiation detecting apparatus comprising a shielded container made of radiation resisting material, said container having at least two shield components, one of said components having a protruding section, the other component having a receding section for receiving said protruding section, said protruding and receding sections having configured wall surfaces spaced from each other and defining therebetween a curvilinear slot, a chamber in one of said components communicating with said slot, a detector disposed in said chamber, a slide retainer disposed in said slot, and means connected to said detector for providing radiation detecting reading of material inserted into said slide retainer.

2. The apparatus according to claim 1, wherein one of said shield components is a cover having a truncated conical portion having a bottom, said protruding section integrally formed with said cover and extending outwardly of said bottom, said other shield component having a cylindrical configuration having a diameter corresponding to the diameter of said bottom and containing a receding section, the bottom of said protruding section having a compound planar surface having a rectilinear plane terminating outwardly in a curvilinear plane, said receding section having a correspondingly matching compound planar surface provided with a rectilinear plane terminating outwardly in a curvilinear plane, said slide retainer possessing a corresponding compound planar surface.

3. The apparatus according to claim 1, wherein the wall thickness of the chamber is defined by the structure of the two shield components is at least two inches thick.

4. The apparatus according to claim 1, including cooperative clamping members on said shield components for maintaining said components in assembled form.

5. The apparatus of according to claim 2, wherein a vertical portion of said conical portion of the cover is truncated to define a vertical wall, and a vertical portion of said cylindrical configuration is truncated to define a vertical wall planarly disposed below said other vertical wall, the opposed edges of said vertical walls and the adjoining walls of said recessed section defining said slot.

6. The apparatus according to claim 1, wherein said slide retainer comprises a rectangular metal sheet, the longitudinal edges of said sheet being turned inwardly to define a pair of spaced tracks, said sheet having an undercut portion defining said tracks are protruding horns, said sheet and said tracks possessing a compound planar configuration conforming to the shape of the curvilinear slot, and a centrally located opening disposed adjacent said detector.

7. The apparatus according to claim 2, wherein said cover includes a tortuous conduit passage communicating between said chamber and an outlet provided with a connector, a cable disposed in said conduit passage and connected between said detector and said connector, and a radiation reading instrument connected to said connector for providing a magnitude reading of the radiation detected by said detector.

8. The apparatus according to claim 6, including a test slide carrier, a test slide retainer carried by said carrier, said retainer comprising an elongated sheet member folded across a transverse axis, the lower fold being secured to said carrier and the upper fold being provided with a radiation transparent window, a test slide comprising a sheet, a swab secured to said sheet, said test slide being insertable between the folds of said retainer aligning said swab with said window, said test slide carrier having a thickness easily accommodated between the spaced tracks for entry into the interior of said shielded container for positioning said swab adjoining said detector.

* * * * *